Aug. 17, 1965

J. DRASCH 3,200,720

ARRANGEMENT FOR CHECKING THE BATTERY VOLTAGE OF
AN ELECTRICALLY DRIVEN FILM CAMERA

Filed Sept. 12, 1961

Inventor:
Josef Drasch
By Ernest Montague
Attorney

United States Patent Office 3,200,720
Patented Aug. 17, 1965

3,200,720
ARRANGEMENT FOR CHECKING THE BATTERY VOLTAGE OF AN ELECTRICALLY DRIVEN FILM CAMERA
Josef Drasch, Vienna, Austria, assignor to Karl Vockenhuber, Vienna, Austria
Filed Sept. 12, 1961, Ser. No. 137,609
Claims priority, application Austria, Sept. 23, 1960, 7,210/60
5 Claims. (Cl. 95—10)

The present invention relates to an arrangement for checking the battery voltage of an electrically driven film camera comprising an exposure control system with a galvanometer energized by a photoelectric cell or the like. A sensitivity regulator is provided in the circuit of said galvanometer for considering the frame frequency of the camera during measurement of the exposure time. For controlling the voltage of the battery the galvanometer may be connected over resistors with the battery terminals.

According to a known proposal, a sensitivity regulator is provided in the galvanometer circuit for considering the frame frequency of the camera during measurement of the exposure value. For checking the battery voltage, the photoelectric cell and the sensitivity regulator are disconnected from the galvanometer by means of a switch. At the same time the galvanometer is connected to the voltage source through resistors. With this arrangement the battery may be checked, whether its voltage will be sufficient for operating the camera at the standard frame frequency. The measurement does not, however, disclose whether the battery voltage will be sufficient to advance the film at an increased frame frequency, at e.g. twice or triple the frame frequency.

It is one object of the present invention to provide an arrangement that makes possible the checking of the battery, whether its charge will be sufficient to assure the camera drive at a certain frame frequency that is different from the standard frame frequency.

It is a further object of the present invention to avoid the arrangement of a switch in the connecting wires between photoelectric cell and galvanometer, so that errors in measurement due to contact resistances, contact potentials and thermoelectric voltages are prevented.

It is another object of the present invention to provide an arrangement for checking the battery voltage of an electrically driven film camera, wherein the photoelectric cell is darkened during the voltage measurement and remains in the galvanometer circuit.

It is still a further object of the present invention to couple this masking means for the photoelectric cell with the switch for checking the battery voltage in such a manner that a voltage control is only possible with darkened photoelectric cell so that errors in the manipulation are precluded with certainty.

With these and other objects in view, which will become apparent in the following detailed description, the present invention will be clearly understood in connection with the accompanying drawings, in which.

Figure 1:
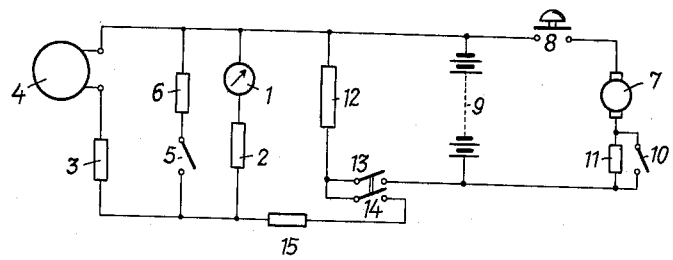
FIGURE 1 is a circuit diagram of the exposure and voltage measuring arrangement.

Referring now to the drawing, and in particular to FIG. 1, the galvanometer 1 is connected through a temperature compensating resistance 2 and an adjustment resistance 3 to a photoelectric cell 4. The galvanometer 1 may be constructed as an indicator or as a diaphragm control system. In the latter instance, it is necessary that the galvanometer coil adjusts also a pointer or the like besides the diaphragm blades, which pointer indicates the respective galvanometer deflection. The illustrated exposure metering circuit is designed for the standard frame frequency e.g. for 16 f.p.s. By closing the switch 5, a resistor 6 may be switched on in parallel to the galvanometer 1, the resistor 6 decreasing the sensitivity of the galvanometer 1. The switch 5 is coupled to the adjusting means for the frame frequency and allows for the decrease in the time of exposure when the frame frequency is increased.

A driving motor 7 of the camera is connected to a battery 9 by means of a switch 8. A centrifugal switch 10 is intermittently short-circuiting the resistance 11. A centrifugal switch 10 is adjustable and permits the adjustment of a frame frequency of e.g. 32 f.p.s. besides the standard frequency adjustment of 16 f.p.s. For the control of the state of the charge of the battery 9, the latter is loaded with a resistance 12. When turning on the resistance 12 by means of the switch 13, the galvanometer 1 is connected to the loading resistance 12 through the switch 14 and the series resistance 15 at the same time. During the measuring of the voltage, the photoelectric cell 4 is masked, so that no voltage is excited on it. Therefore, the photoelectric cell 4 acts as a highly-resistive resistance, when the voltage is measured. The deflection resulting from the minimum voltage required for operating with the standard frame frequency is indicated on the galvanometer scale or the like. If the galvanometer deflection exceeds this value, it is possible to take pictures at a frame frequency of 16 f.p.s.

If it is to be checked whether the battery voltage will suffice for driving the camera at e.g. 32 f.p.s., the switch 5 is closed and the galvanometer sensitivity reduced to about fifty percent of the original value. This serves the fact that for driving the motor at the double speed of rotation about double the voltage is required. In order to obtain as far-reaching an adjustment to the actual circumstances as possible, the resistance 12 may be switchable according to the current consumption at the individual frame frequencies. The changing over could be made necessarily by operating the switch 5.

Figure 2:
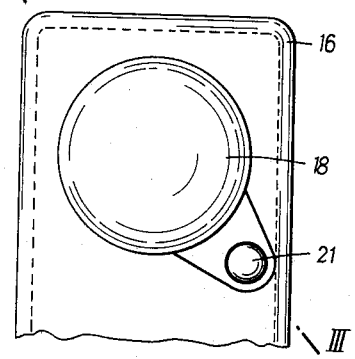
FIG. 2 is a plan view of a detail of the present invention.
Figure 3:
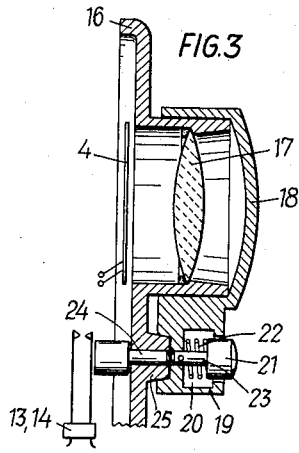
FIG. 3 is a section along the lines III—III of FIG. 2.

One embodiment of the present invention is illustrated in FIGS. 2 and 3, which assures a voltage control only with the photoelectric cell 4 being masked. In order to achieve this end, a masking cap 18, which has a lateral prolongaton 19, is put on the mount 16 of the lens 17 which is disposed in front of the photoelectric cell 4. In a boring 20 of the prolongation 19 of the masking cap 18, a knob 21 is arranged, which is maintained in its resting position by means of a spring 22 mounted in the boring 20 and engaging the knob 21. With the masking cap 18 put on the mount 16, a pin 23, extending from the knob 21, is facing a second pin 24 axially movable in a bore of the camera casing or mount 16. By pressing the knob 21, the pin 23 is pushed into the bore of the camera casing 16. By the axial movement of the pin 23, the pin 24 is shifted towards the left (FIG. 3 of the drawing) and closes the switches 13 and 14. The masking cap 18 is centered by a conical projection 25 of the camera casing 16.

With the masking cap 18 in its detached position, it is impossible to operate the voltage control mechanism, as the pin 24 is arranged such that its front end face is flush with the front face of the projection 25.

Figure 4:
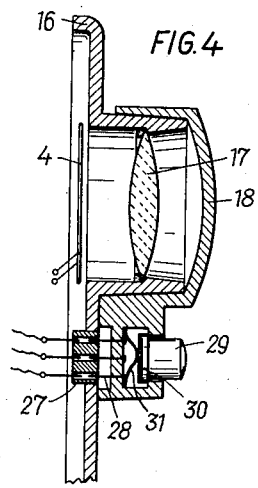
FIG. 4 is a modification of the section, similar to that of FIG. 3, yet disclosing another embodiment thereof.

Referring now again to the drawing, and in particular to the embodiment disclosed in FIG. 4, a multipolar plug 27 is provided in the camera front plate. The respective plug pins 28 are mounted on the masking cap 18 for the photoelectric cell 4. The plug pins 28 are designed on their free end as switching contacts. A contact plate 30 faces the switching contacts, which contact plate 30 is mounted on a knob 29 extending from a recess of a projection of the masking cap 18. A spring 31 retains the knob 29 in its resting position. In this embodiment, the switches, formed by the switching contacts 28 and 30, assume the function of the switches 13 and 14 in FIG. 1. Upon pressing the knob 29, the contacts 28 are conductively connected. As here also a voltage control is possible only with the masking cap 18 in its operative position, errors in the checking manipulation are avoided with certainty.

The present invention is not restricted to the illustrated embodiments. There are numerous variations possible without leaving the scope of the present invention.

Thus it is possible that the scale of the galvanometer 1 e.g. shows markings besides the markings for the minimum battery voltage, these markings showing the state of the charge of the battery 9 and permitting a forecast on the battery life to be expected. In an advantageous manner the indication is made in film lengths which may be run off at the respective frame frequency by means of the battery 9.

While I have disclosed several embodiments of the present invention, it is to be understood that these embodiments are given by example only and not in a limiting sense, the scope of the present invention being determined by the objects and the claims.

I claim:
1. In an electrically driven cinematographic camera, an electric driving motor for operating said camera at a preselected frame frequency, a battery supplying current to said motor, an exposure control system including a photoelectric cell, a galvanometer energized by said photoelectric cell in dependence on the light conditions of an image field, a sensitivity regulator in the circuit of said galvanometer adjustable in accordance with the frame frequency of said camera and adapted to consider said frame frequency of the camera in the result of the exposure measurement, a switch, said switch being manually adjustable and in one position conductively connecting said galvanometer circuit including said sensitivity regulator with said battery and with said photoelectric cell for checking the battery voltage, the deflections of said galvanometer being dependent upon the adjustments of said galvanometer sensitivity regulator according to different frame frequencies, and the galvanometer deflection attaining the same value for all frame frequency adjustments, if said battery shows the respective minimum voltage required for operating said camera at the frame frequency adjusted on the galvanometer sensitivity regulator, masking means completely darkening said photoelectric cell during the checking of the voltage of said battery, said darkened photoelectric cell remaining in the circuit of said galvanometer during the checking of the battery voltage, and attaining a very high internal resistance thus having no influence on the result of voltage measurement and avoiding switches in the connecting wires of the photoelectric cell and said galvanometer.

2. In an electrically driven cinematographic camera an electric driving motor for operating said camera, a battery supplying current to said motor, an exposure control system including a photoelectric cell, a galvanometer energized by said photoelectric cell in dependence upon the light conditions of an image field, a sensitivity regulator in the circuit of said galvanometer adjustable in accordance with the frame frequency of said camera and considering said frame frequency of said camera in the result of the exposure measurement, a switch, said switch in one position conductively connecting said galvanometer circuit including the sensitivity regulator with said battery for checking the battery voltage, masking means completely darkening said photoelectric cell during the checking of the voltage of said battery, said darkened photoelectric cell remaining in the circuit of said galvanometer during the checking of the battery voltage, attaining a very high internal resistance thus having no influence in the result of the voltage measurement, means for cooperation of said masking means with said switch such that checking the battery voltage is possible only upon complete darkening said photoelectric cell by said masking means, the deflections of said galvanometer depending on the adjustments of the galvanometer sensitivity regulator according to different frame frequencies, the galvanometer deflection attaining the same value for all frame frequency adjustments if the battery shows the respective minimum voltage required for operating said camera at the frame frequency adjusted on the galvanometer sensitivity regulator.

3. The electrically driven cinematographic camera, as set forth in claim 2, wherein said masking means comprises a cap detachably mountable in front of said photoelectric cell, a key controlling said switch, said key being mounted on said cap, and said switch being operable only upon mounting said cap on said photoelectric cell.

4. In an electrically driven cinematographic camera, a camera casing, an electric driving motor for operating said camera, a battery supplying current to said motor, an exposure control system including a photoelectric cell, a galvanometer energized by said photoelectric cell in dependence upon the light conditions of an image field, a sensitivity regulator in the circuit of said galvanometer adjustable in accordance with the frame frequency of said camera and considering said frame frequency of the camera in the result of the exposure measurement, a switch, said switch, in one position conductively connecting said galvanometer circuit including the sensitivity regulator with said battery for checking the battery voltage, a masking cap detachably mountable in front of said photoelectric cell to completely darken the latter, a knob axially movable on said cap, elastic means biasing said knob in its resting position, a pin secured to said knob, said camera casing having an opening, said switch mounted within said camera casing opposite said opening, said pin being adapted to enter said opening in said camera casing and actuating said switch upon pressing said knob, the deflections of said galvanometer depending upon the adjustments of said galvanometer sensitivity regulator according to different frame frequencies, the galvanometer deflection attaining the same value for all frame frequency adjustments if the battery shows the respective minimum voltage required for operating said camera at the frame frequency adjusted on said galvanometer sensitivity regulator.

5. In an electrically driven cinematographic camera an electric driving motor for operating said camera, a battery supplying current to said motor, an exposure control system including a photoelectric cell, a galvanometer energized by said photoelectric cell in dependence upon the light conditions of an image field, a sensitivity regulator in the circuit of said galvanometer adjustable in accordance with the frame frequency of said camera and considering said frame frequency of the camera in the result of exposure measurement, a switch, said switch in one position conductively connecting said galvanometer circuit including the sensitivity regulator with said battery for checking the battery voltage, a masking cap detachably mountable in front of said photoelectric cell to completely darken the latter, said switch being arranged on said cap, plug contacts conductively connecting said switch and the battery checking circuit upon mounting said cap in front of said photoelectric cell, the deflections of said galvanometer depending on the adjustments of said galvanometer sensitivity regulator according to different frame frequencies, the galvanometer deflection attaining the same value for all frame frequency adjustments if the battery shows the respective minimum voltage required for operating said camera at the frame frequency adjusted on the galvanometer sensitivity regulator.

References Cited by the Examiner

UNITED STATES PATENTS

| | | | |
|---|---|---|---|
| 2,892,978 | 6/59 | Pera | 324—29.5 |
| 2,918,854 | 12/59 | Malek | 325—141 |
| 2,996,965 | 8/61 | La Rue et al. | 352—141 XR |
| 3,006,239 | 10/61 | Smolar | 352—180 |
| 3,063,004 | 11/62 | Vic | 324—29.5 |

FOREIGN PATENTS

| | | |
|---|---|---|
| 1,235,184 | 5/60 | France. |
| 1,056,470 | 4/59 | Germany. |

NORTON ANSHER, *Primary Examiner.*

WILLIAM MISIEK, *Examiner.*